US012775336B2

(12) United States Patent
Candelore et al.

(10) Patent No.: US 12,775,336 B2
(45) Date of Patent: Oct. 27, 2026

(54) HEAD GESTURE-BASED CONTROL WITH A HEARABLE DEVICE

(71) Applicant: Sony Group Corporation, Tokyo (JP)

(72) Inventors: Brant Candelore, Poway, CA (US); James R. Milne, Ramona, CA (US); Justin Kenefick, San Diego, CA (US); William Clay, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 256 days.

(21) Appl. No.: 18/642,613

(22) Filed: Apr. 22, 2024

(65) Prior Publication Data

US 2025/0306688 A1 Oct. 2, 2025

Related U.S. Application Data

(60) Provisional application No. 63/571,967, filed on Mar. 29, 2024.

(51) Int. Cl.
*G06F 3/01* (2006.01)

(52) U.S. Cl.
CPC .............. *G06F 3/017* (2013.01); *G06F 3/012* (2013.01)

(58) Field of Classification Search
CPC ........... G06F 3/017; G06F 3/012; G06F 3/013
See application file for complete search history.

(56) References Cited

U.S. PATENT DOCUMENTS

2015/0358579 A1* 12/2015 Shin ....................... H04N 7/142 348/14.16
2016/0080874 A1 3/2016 Fullam
2023/0164508 A1 5/2023 Shin
2024/0406667 A1* 12/2024 Fernandez Franco .. H04S 7/304
2025/0123691 A1* 4/2025 Edelson .................. G06F 3/011

FOREIGN PATENT DOCUMENTS

CN 106774939 A 11/2019
EP 4064730 A1 9/2022
KR 20140147057 A 12/2014
WO WO-2018141409 A1 * 8/2018 ............. G06F 3/012

OTHER PUBLICATIONS

Edelson et al., Multi-Modal Inputs for Wearable Devices, U.S. Appl. No. 63/591,111, filed Oct. 17, 2023 (Year: 2023).*
(Continued)

*Primary Examiner* — Tam T Tran
(74) *Attorney, Agent, or Firm* — Trellis IP Law Group, PC

(57) ABSTRACT

A head gesture control system is provided that enables user control of features associated with a hearable device by using head gestures. The system determines that a movement by a user is a head control gesture designated for a particular adjustment. Various gesture factors are employed in this determination. The head control gesture may be used in combination with other types of device controls, such as tap and voice. A feedback indicator is provided back to the user describing the feature adjustment and enabling the user to ensure proper control is carried out. The user can then make additional or different adjustments or cancel the adjustment, if desired.

18 Claims, 8 Drawing Sheets

600

(56) References Cited

OTHER PUBLICATIONS

Rishabh Gupta et al., Augmented/Mixed Reality Audio for Hearables, May 1, 2022, IEEE Signal Processing Magazine, vol. 39, Issue 3, pp. 63-89 (Year: 2022).*
Shivam Rustagi et al., Touchless Typing Using Head Movement-based Gestures, Sep. 1, 2020, IEEE International Conference on Multimedia Big Data, pp. 112-119 (Year: 2020).*
https://www.apple.com/in/newsroom/2023/06/introducing-apple-vision-pro/ ; Introducing Apple Vision Pro: Apple's first spatial computer ; Jun. 5, 2023.
Tech Desk, "Noise launches gesture controlled IntelliBuds TWS: Check specs, price" IE Online Media Services Pvt Ltd, First published on: Dec. 10, 2022, https://indianexpress.com/article/technology/gadgets/noise-intellibuds-tws-features-specs-price-8204242/.

* cited by examiner

HEAD GESTURE-BASED CONTROL WITH A HEARABLE DEVICE

CROSS REFERENCES TO RELATED APPLICATIONS

This application claims the benefit of U.S. Provisional Application No. 63/571,967, entitled HEAD GESTURE-BASED CONTROL WITH A HEARABLE DEVICE, filed on Mar. 29, 2024 (020699-124700US/SYP352697US01), which is hereby incorporated by reference as if set forth in full in this application for all purposes. This application is also related to the following application, U.S. patent application Ser. No. 18/622,606, entitled NON-SPEECH SOUND CONTROL WITH A HEARABLE DEVICE, filed on Mar. 29, 2024 (020699-124600US/SYP352670US01), which is hereby incorporated by reference as if set forth in full in this application for all purposes.

BACKGROUND

Non-verbal behaviors can be used to communicate in subtle ways. A head gesture, such as a gaze, a shrug, or a nod can communicate different intents according to culture, context, or definition. Devices that allow for gesture interactions by users can allow for greater use of the device. Head gesture device controls can allow users to multitask by freeing hands and voice. Typically, users can control devices by pressing buttons, tapping or otherwise touching a portion of the device, opening an application on another device (e.g., a smart phone), or using voice assistance.

Hearable devices (interchangeably called "hearables") include a variety of ear worn devices configured to alter the hearing abilities of the user, such as playing audio close to or into the ear (e.g., headphones, earbuds), blocking environmental audio (e.g., headphone covering the ears and noise canceling devices), enhancing hearing of environmental audio (e.g., hearing aids), etc. Use of hearable devices have become common accessories to be worn and connected with other devices, such as smart phones, that have become constant fixtures for people. Simple, hands free control using hearables devices can be a significant convenience.

SUMMARY

A head gesture control system (also called "control system", "gesture control system" or "system") is provided that enables user control of features associated with a hearable device by using head gestures. The system determines that a movement by a user is a head control gesture designated for a particular adjustment. Feedback is provided back to the user describing the feature adjustment, e.g. boosting voice frequencies, and enabling the user to ensure proper control is carried out. The user can then make additional or different adjustments or cancel the adjustment, if desired.

A method is provided for using head gestures to control of one or more features associated with a hearable device. The hearable device detects at least one user movement and typically a plurality of user movements of a user using the hearable device. The user movement(s) are identified as a head control gesture by applying one or more gesture factors that correlate with particular adjustments of a feature. The head control gesture corresponds to a particular adjustment of a feature associated with the hearable device. Based, at least in part, on identifying the head control gesture, the feature is adjusted according to the particular adjustment. The feature that may be adjusted in this manner may be selected from the group of: setting, mode, audio content player, audio beam focus, sound tracking, calling interaction, and smart assistant operation. Other features may also be possible to be adjusted in this manner. A feedback indicator may be outputting to the user. The feedback indicator provides a description of the feature adjustments.

Some implementations may include a locking functionality in which the user movement is assessed to determine a target sound source in an environment of the user to which the feature adjustment is to be directed. The feature may include one or more audio elements. One or more microphones of the hearable device receive sound signals for a sound from the target sound source. Based, at least in part, on determining the target sound source, the control system locks the features onto the target sound source, for example, by adjusting one or more audio elements of the hearable device to enhance hearing of the sound. A change in direction of the target sound source can be tracked as it moves location relative to the user. Based on the change in direction, the feature may be adjusted to maintain enhanced hearing of the sound.

A change in direction of the target sound source is tracked, such as via sensors of the hearable device or otherwise in communication with the hearable device. Based on the change in direction, the feature may be readjusted to maintain enhanced hearing of the target sound source.

In some aspects, the head control gesture may include at least one eye gaze event for a predefined period of time in a direction of the target sound source. The feature may also include audio beam focusing. In some cases, the feedback may include a notification of a section of a sound field that the audio beam focusing is directed.

Output of the feedback indicator may also include steps such as receiving by one or more microphones of the hearable device, sound signals from a target sound source. The sound may be matched with a stored sound print of one or more stored sound prints of candidate sound sources. The target sound source may be identified as a recognized source of the candidate sound sources. The feature indicator may be an output of an audio identification of the recognized source. And this may therefore cause this recognized source to be tracked and focused regardless of head control gestures or other controls.

In still some implementations, user movement may be detected for which context information associated with the user movement may be gathered; applying one or more non-gesture factors to identify the user movement as a non-gesture movement; and rejecting the non-gesture movement to control of the feature. It should be noted that head control gestures can be used in combination with other controls such as tapping the device and voice control.

At times, the user movement may be assessed from a starting point of a base head position. The base head position may be detected prior to the user movement. For example, the base head position may be used to positionally focus a locking of a sound source that is directly in front of the user using a head gesture, such as a couple of rapid nods. Assessment of the user movement may be relative to the base head position. For example, when the user rotates the head, the focus on the sound source can be kept locked. As discussed in more detail later, the base head position is useful to more easily determine other gestures such left and right head tilts and side tilts.

In some implementations, an inquiry may be outputted to the user regarding user control of a feature. User movement is detected and determined whether the user movement is responsive to the inquiry. The feature adjustment may take place or be halted, accordingly.

In some implementations, head gesture control system (also referred to as an apparatus) is provided, which is configured to adjust a feature associated with a hearable device. The head gesture control system has at least one sensor to detect a plurality of user movements of a user using the hearable device. The system also includes a hearable device including one or more processors and logic encoded in one or more non-transitory media for execution by the one or more processors and when executed operable to perform various operations as described above in terms of the method. Additional operations may be performed for example to combine the head control gesture with other input controls. At least one of a tactile input, voice input, and voice input may be detected and identified as a control input for the feature associated with detected head control gesture. The feature of the hearable device may be adjusted based on identifying the control input as well as the head control gesture.

In some implementations, the control system may include a wearable configured to be worn by the user and holding the sensor positioned to detect the plurality of first user movements.

In some implementations, a non-transitory computer-readable storage medium is provided which carries program instructions for adjusting features based on detected user head control gestures. These instructions when executed by one or more processors cause the one or more processors to perform operations as described above for the focusing method described above.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

FIGS. 2A and 2B are conceptual diagrams illustrating examples of the head gesture control system in which FIG. 2A shows use of a head control gesture to direct a size of a focus area and FIG. 2B shows use of head control gesture to focus on an object, in accordance with some implementations.

DETAILED DESCRIPTION OF EMBODIMENTS

Figure 1:
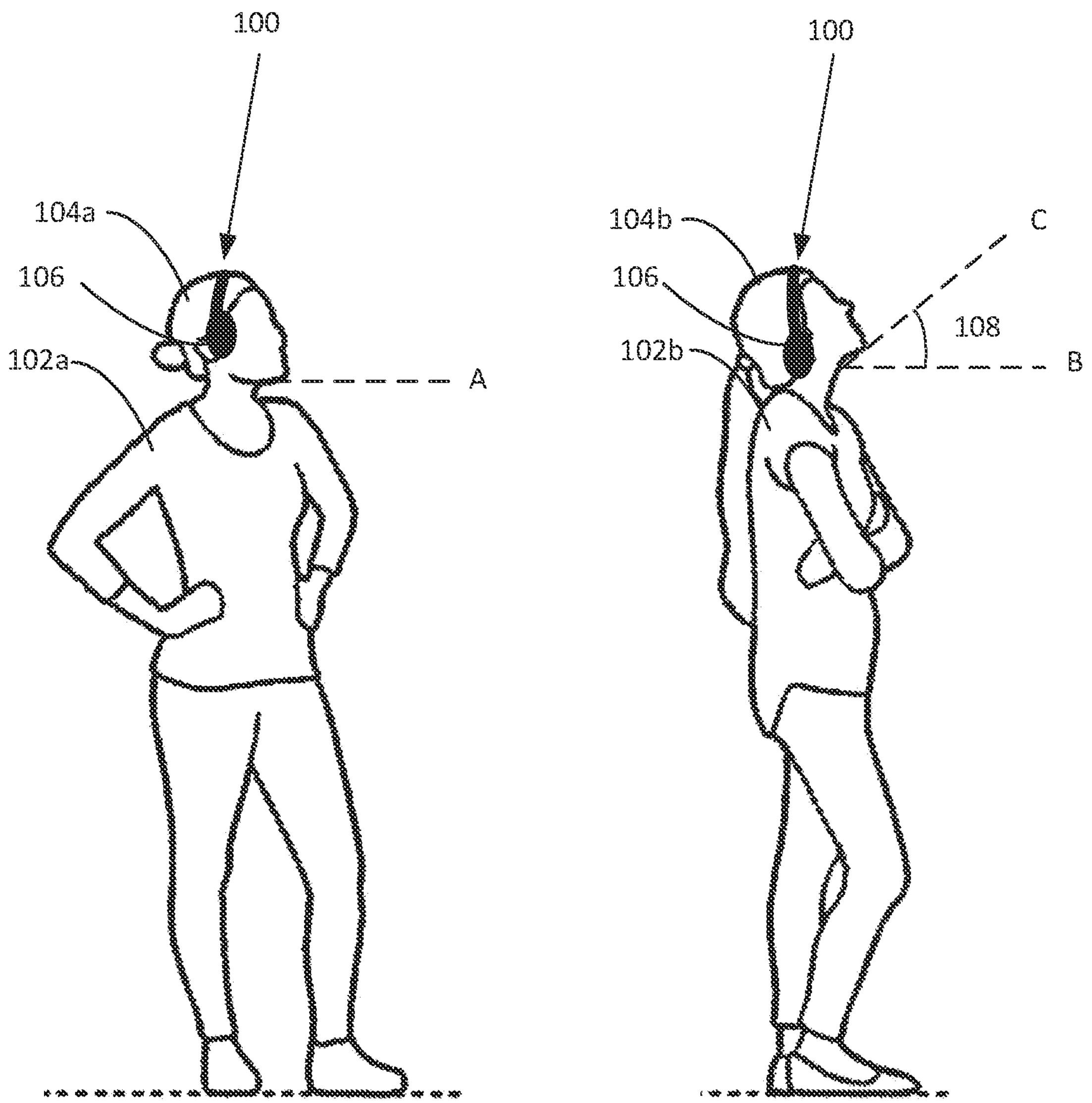
FIG. 1 is a conceptual diagram illustrating an example of the head gesture control system in which head level is detected, in accordance with some implementations.

The present head gesture control system enables a user to control a hearable device by merely making movements associated with the head of a user of the hearable device without the need for inputs through touch or voice commands. The head control gestures can be subtle and easy for a user to carry out with little interruption to other tasks performed by the user. The control system is also beneficial for users who have restricted abilities to perform these other traditional types of control inputs. To ensure that adjustments are carried out as intended by the user, the control system can provide various types of audible, tactic, or visual (e.g., if using virtual reality glasses) feedback of the adjustments to a feature associated with the hearable device. Other aspects may include an ability to filter out non-gesture movements by the user to avoid or correct mistaken feature adjustments. The control system may further simplify control of a feature by locking onto an intended sound source and maintain the feature adjustment as the sound source position changes, e.g., moves around the environment. In some instances various traditional device control mechanisms, such as pressing buttons, tapping the device, opening an application, using voice assistance, can be combined with head control gestures to further control the device.

The control system employs gesture factors to detect head control gestures that direct an adjustment to be made to a feature associate with a hearable device. Gesture factors may be sufficiently satisfied to determine that a user movement is a head control gesture. The term “satisfying” in applying gesture or non-gesture factors as used in this description, may include complying with a substantial number of factors, weighted gesture factors (or non-gesture factors) or other processes to determine if factors are sufficiently satisfied. In some implementations, a threshold confidence value may be applied to determine whether adequate non-gesture factors are satisfied to accept or reject the user movement as a head control gesture.

The gesture factors that define the head control gestures may be specific for various control characteristics, such as gesture factors indicating a type of feature associated with the hearable device, gesture factors specific for a kind of adjustment, and gesture factors for an amount (e.g. degree or level) of the adjustment. For example, the system may detect a head level change downward from a base head position by 45 degrees from a base position and recognize the gesture factors of level down and 45 degrees down as a control gesture for a feature such as selecting a mode (e.g., entering a control input mode) or setting of the hearable device. Typically the gesture factors are significantly distinct to differentiate between various control gestures. For example, distinguishing angles of movement may be greater than 20 degrees for each gesture factor. Smaller distinguishing angles may make it be difficult to tell one user movement from other user movements. Various gesture factors are possible.

The hearable device of the head gesture control system can include a variety of types of hearing devices, such as earbuds, smart headphones, hearing aids, bone phones (bone conducting), and other ear directed devices configured to be worn (including insertable and implantable) that alter sounds heard by a user and may include various features that a user can control. Typically, the hearable device includes speakers that fit over or inside one or more ears. Some hearables may function solely for noise canceling for a user to block environmental sounds. Other hearables may be multifunctional to allow for multiple sensory enhancements, such as hearing aids for hearing corrections, audio listening devices that deliver audio content to the user, including smart headphones, smart earbuds, etc.

The hearable may include one hearing unit dedicated to one ear of the user, or may include a pair of hearing units (left and right) for a respective ear of the user. Processing circuitry and/or software components of a hearable device can capture, process, block, reduce, and/or amplify sounds that pass to the ear canal of the user. Other components of the hearable may be for securing the hearable in place when worn by the user, such as a band, cup, etc. Although specific examples of hearables are described, it should be understood that the head gesture control system may also be applied to other hearable devices include components for identifying head control gestures and initiating adjustments to features according to such gestures, as described below.

A user movement and user control gesture include the physical movement of a part of a user body (including eye movement) associated with the head to a position and also may include the holding of the position (e.g., a gaze) and/or return to the original position (e.g., a head shake).

The "head gesture", as applied in this description refers to various user movements that communicate an intent to control an aspect of a feature associated with the hearable device. The head control gesture may be movement of the head, facial expression, eye movement, and the like. Head gestures may include changes of head positions, such as nod, shake, facial expressions including raising eyebrow, eye movements, such as eye gazing, blinking, wide eye, winking. Other head gestures are possible that are associated with head movement to communicate intent to control the hearable device in a specific manner.

The "user" of the head gesture control system as applied in this description refers to a person who uses (e.g., wears) the hearable device as part of the head gesture control system. A "sound source" for the purpose of this description, is generally located in the environment of the user and excludes the user itself as a source of the sound.

The user may employ the head gesture control system while the user goes about day-to-day activities with little disruption to those activities. Other hearables that do not employ the present head gesture control system, may require the user to use fingers to control a smart phone or touch a hearable. Some other hearables may require user voice commands to control features.

Some hearables, such as hearing aids, are configured to enhance hearing of the user who may not otherwise be able to sufficiently hear environmental noises. Non-audio based beamforming may be beneficial for example, in cases where a sound source can be seen but not heard very well by the user, like a child talking with soft voice. A hearable that is configured to assist with hearing that does not employ the present gesture control system may need a user to first hear a sound and then controlling the hearable toward the source of the sound. This can result in the user missing some of the sound in the process. The present control system, by contrast, enables the user to perform a simple head movement, such as a head tilt, in the direction of the sound source in anticipation of a sound before the sound occurs. For example, the user may be aware of a direction of a sound source, but may not hear the sound, and yet the user may adjust the system to focus on the anticipated sound. The present head gesture control system addresses these problems with other systems and have additional benefits that will be apparent by this description.

The head control gestures include head-associated movements that may be distinguished from random movements and comply with gesture factors that define a particular feature control. The head control gestures may include a combination of user movements, pattern of movements, characteristics of the movements (such as linear, smooth gradation, fast, increase or decrease speed, etc.).

Example Gesture Factors for Head Control Gestures

| | | | | | |
|---|---|---|---|---|---|
| Leveling | Level to Up | Up to Level | Level to Down | Down to Level | Linear, Smooth Gradation |
| Tilt | Upright to Left | Left to Upright | Upright to Right | Right to Upright | Linear, Smooth Gradation |
| Tilt Duration | Tilt Left 2 seconds | Tilt Right 2 seconds | | | |
| Side Tilt | Tilt 1x | Tilt 2x | Tilt 3x | Tilt 4x | |
| Up/Down (U/D) Nod | U/D Nod 1x | U/D Nod 2x | U/D Nod 3x | U/D Nod 4x | U/D Nod Response "Yes" |
| Left/Right (L/R) Nod | L/R Nod 1x | L/R Nod 2x | L/R Nod 3x | L/R Nod 4x | L/R Nod Response "No" |

In some implementations, the head control gesture may be in response to an inquiry presented by the gesture control system. For example, the control system may output an inquiry as audio speech asking whether the user wants a particular feature adjustment or confirmation that the user intends to make a particular feature adjustment by a previous head control gesture. The head control gestures may be an up and down nodding movement to indicate a positive or "yes" response or a left and right nodding movement to indicate a negative or "no" response.

The head control gestures may also include eye movements detectable by the control system by an eye tracking functionality. The control system may detect a user move eyes to gaze in a direction of a field of view of the user and hold the gaze for a period of time. The control system may match the gaze time with a gesture factor specifying the period of time to maintain the gaze and identify the gaze event as a head control gesture. In some implementations, the user movement may include eye blinking. A gesture factor may specify a blinking pattern (such as a number of fast blinks, followed by a pause and then a number of slow blinks) or a blink time (e.g., holding the eye open and/or closed for a number of seconds) to identify a head gesture control. Other eye movements may be performed in a similar manner to identify eye-type head control gestures, such as looking in a particular direction, crossing eyes, close one eye an open other eye, etc.

Other types of head control gestures defined by various gesture factors are possible. In some implementations, a combination of head movements may create a pattern recognized as a head control gesture, such as a nod followed by a head rotation.

The features associated with the hearable device that may be adjusted using the head control gestures may include various internal features with hardware and software integrated within the hearable device, such as operational settings, modes of operation, content player functions, audio beam forming, and other hearable device features adjustable by a user. Some examples of hearable setting may include loudness or volume, graphic equalizer, bass, treble, noise cancelation function, boosting sound for selected frequency ranges, etc.

Some examples of hearable modes may include control input mode, noise cancelation presets, ambient sound, front focus, tinnitus help, quick attention (e.g., turn down content player, call sounds, and the ringtone to allow ambient sound to be easily heard), speak-to-chat (e.g., pause or mute content player and capture using the microphones the voice of a person that the user converses with), priority on stable connection, priority on sound quality, etc.

Activating a control input mode can enable the hearable device to receive other control inputs entered by the user, e.g., further inputs to control an audio or video source, for example, to make a source selection, change the volume, pause/play, rewind/fast forward. By activating the control input mode the hearable may receive various other inputs, such as physical buttons (pressed or capacitive touch, toggle, rocker) or tap, voice, etc. The user could then make sound source adjustments, such as change from ambient sound to different levels of noise cancellations, different modes and types of sound tracking, controlling the width of the audio beam, etc.

An operational setting that can be adjustable by the control system typically handles a single parameter of the hearable device. For example a volume setting may be adjusted to increase or decrease a sound output value. A mode that can be adjustable by the control system typically includes a combination of settings (i.e. parameters) used together as a group. For example, a mode may handle parameters of an active noise cancelation including turning “on” or “off”, activating a certain noise cancelling preset, and setting the volume to a particular sound output value.

Content player features enable changes to the audio content played through the speakers of the hearable device. Some examples of content player may include play, pause, skip to the beginning of a next or previous track, fast forward, fast reverse, rewind, stop, pause, select content, next content, volume increase or decrease of content, etc. It should be noted that content player features could be used to control a player device that also renders video, such a music video.

Beam forming may also be a feature controlled by the present gesture control system. Various audio elements, such as filtering and/or amplification may be adjusted such as to focus on a particular direction, lock onto an object, directed to a section of a sound view or field of view, etc. The audio beam forming control may focus audio elements onto a person having a conversation in the horizontal and/or vertical planes of the microphone(s) in front of the user at different distances. In some implementations, the distance of the audio beam forming may be controlled by the head control gestures, stepping between preset distances by the user repeating a user movement for each step, such as 5, 10, 15, or 20 feet.

A sound field, similar to a field of view, includes the area surrounding the user in which a sound source is present. In some implementation, a width of a focus area may be adjusted using the head control gestures, such as nodding of the head. For example, a focus area may be narrowed or widened relative to the user in the sound field of the user. The focus area distance from the user may also be adjusted, such as near focus area or far focus area from the user.

In some implementations, the user may perform a head control gesture to indicate a target direction or section of the sound field or indicate a particular sound source onto which to focus the hearable device. For example, the control system may recognize a pattern of head movements, such as head rotation combined with head nodding in a target direction for the beam forming.

Some external features that may be controlled by the head control gestures may include hardware or software located external to the hearable device and associated with the hearable device by a communication connection with the hearable device. In some examples, the hearable device may control a phone or video call interactions with an external smart phone or other calling device, such as accepting a call, ending a call, adjusting volume of the call, etc. In some implementations, the hearable device may be used to control an operation of an external smart assistant (e.g., Alexa, Siri, Google Assistant) that is in electronic communication, e.g., via BLUETOOTH. To control such external features, the hearable device may identify the head control gesture that corresponds with an aspect of the external device, e.g., smart assistant, and transmit control signals to a receiver of the external device to request the smart assistant make the adjustment to the feature.

FIG. 1 is an illustrative example of the head gesture control system 100 employed by users 102*a*, 102*b* in which head level is detected. Head 104*a* of user 102*a* is held in a neutral, non-gesture position and head 104*b* of user 102*b* is moved to an upward facing in a head gesture control position. The head gesture control system 100 includes a hearable device 106 worn by users 102*a*, 102*b*.

The control system may determine a base position from which user movement is assessed. User 102*a* holds head 104*a* at a determined base position, e.g., at least substantially level, along imaginary line A. The pose of the base position is a zero position from which movement is measured or compared to an end gesture position. The base position may be an ordinary or natural way of holding the head. The base position typically is not considered a head control gesture. The base position may be a starting position for any movement associated with the user head. For example, head control gestures that include eye looking movement may reference a base position of the eyes of the user. Changes in gaze may be compared to the base eye position. Similarly, where the head control gesture includes a change in facial expression of the user, a neutral facial expression of the user may be used as a reference to determine the movement into the facial expression that is a head control gesture.

In some implementations, the base position is predefined and learned by the user as a starting position to control the hearable device. In some implementations, the base position may be specific for a user. The control system may monitor the user head position over a period of time to detect a typical neutral position for the user 102*a* and designate the base position. For example, the control system may log into storage user head positions held by the user across for a period, e.g., an hour, prior to a suspected head control gesture. The system may determine that a most frequently held head position is the base position. In another implementation, the head position that the user holds for the longest time prior to a suspected gesture control movement may be considered the base position. In still some implementations, a base position is defined based on the circumstances of the user, such as time of day, environment, activity of the user, etc.

In some implementations, the control system may employ an artificial intelligence (AI) model to predict a base position for the user. The AI model may be trained on head positions, including eye positions, that are typical for a group of sample users or for the subject user. In some implementations, AI model training may include typical head positions when the user performs certain common activities. For example, the AI model may be trained that when the user watches TV at home, the user typically has his or her head cocked a certain way for periods of time. Likewise, when the user is in a car, the user is in the front seat and looks through the windshield straight ahead. When walking, the user typically looks at the ground a certain distance in front. Further, when the user watches TV, the source of the sound is coming from the TV (or external speakers) and that could be "locked-in" while the person might be interacts with a dog or moving things around.

User 102*b* moves head 104*b* upward from the base position shown by user 102*a*. The degrees of upward movement is measured by angle 108 between the base position along imaginary line B and upward position along imaginary line C. For example, angle 108 may be 45 degrees from the base position. The angle 108 of the movement between the base position and the upward position may be sufficient to trigger a particular adjustment of a feature of the hearable device 106. Various level angle thresholds may be predefined to trigger the feature adjustment.

Figure 2A:
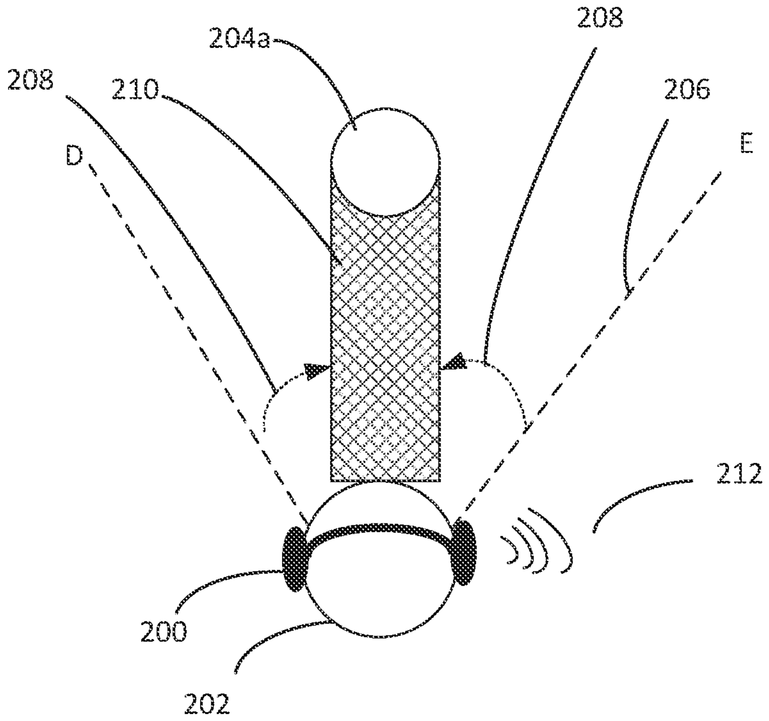
Figure 2B:
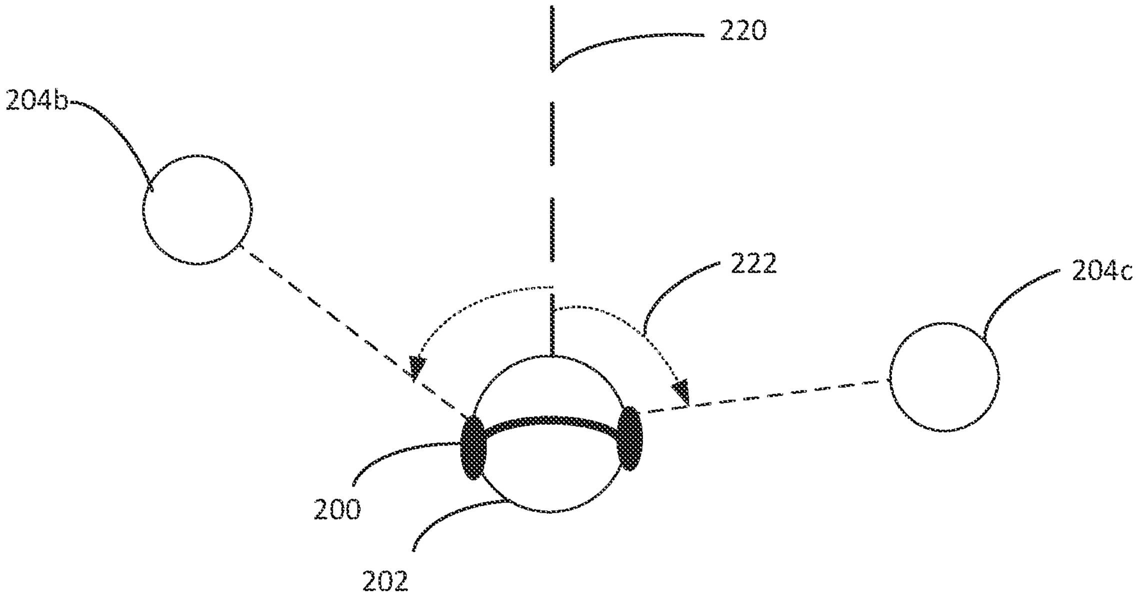

The control system may employ head control gestures to adjust a feature relative to the environment of the user. FIGS. 2A and 2B show examples of the head gesture control system in which an area or source in a sound field in an environment of the user are indicated by user movement to adjust a feature onto the target.

FIG. 2A illustrates one application of a gesture control system 200 to control a focus area in the environment for audio elements of the hearable device by using a control gesture. The focus area may include a sound source object 204 that produces sound that the user 202 intends to hear. The size of a focus area, e.g., width, can be varied by a head control gesture of a user 202. One or more features of the hearable device may be directed toward the initial focus area 206 according to the head control gesture. Prior to the user making this feature adjustment the initial focus area 206 may be defined as a space between imaginary dotted lines D, E as an initial space of focus of certain audio elements of the hearable device.

The user performs user movements that the gesture control system 200 identifies as a head control gesture, such as repetitive nodding. In some implementations, the number of nods or time period of the nodding may correlate with the narrowing or widening of the focus area, for example, making incremental size changes with each repetitive head movement. The head control gesture directs adjustment 208 (illustrated by imaginary dotted arrow lines) of the features (s) to narrow the focus area 210 to fit proximal to the object 204*a*. In some implementations, a feedback indicator 212 may be outputted. For example, a voice announcement may be directed to be heard solely by the user of the hearable, rather than a generally output for others to hear, Feedback may also include certain discrete sounds, such as a beep to indicate the feature adjustment.

The feedback indicator 212 may include a tactile feedback by movement of one or more headphone components in contact with the user (e.g., vibration of headphone cups) for each incremental change in the focus area, thereby providing the user with information on the adjusted size of the focus area made in response to the head control gestures. In various implementations, the tactile feedback may be output at the same time as an audio descriptive feedback indicator or before the audio descriptive feedback indicator, as an extra user alert.

A fitted focus area may facilitate enhanced hearing of sounds made by the object 204*a* (sound source) without potentially interfering noises elsewhere in the environment. In some implementations, the fitted focus area may be expanded to encompass a wider area of the environment, for example to include a group of sound sources.

FIG. 2B illustrates one application of a gesture control system 200 to direct a feature onto a point of focus such as object 204*b* by use of a head control gesture of a user 202. The feature may exclude object 204*c* from the point of focus.

In an example, the head control gesture may include a combination of head movements, such as nodding and rotating the head toward the target object 204*b*. The gesture control system 200 may reference a base position 220 as a starting point to detect the head rotation in the direction of the object 204*b*.

Figure 3:
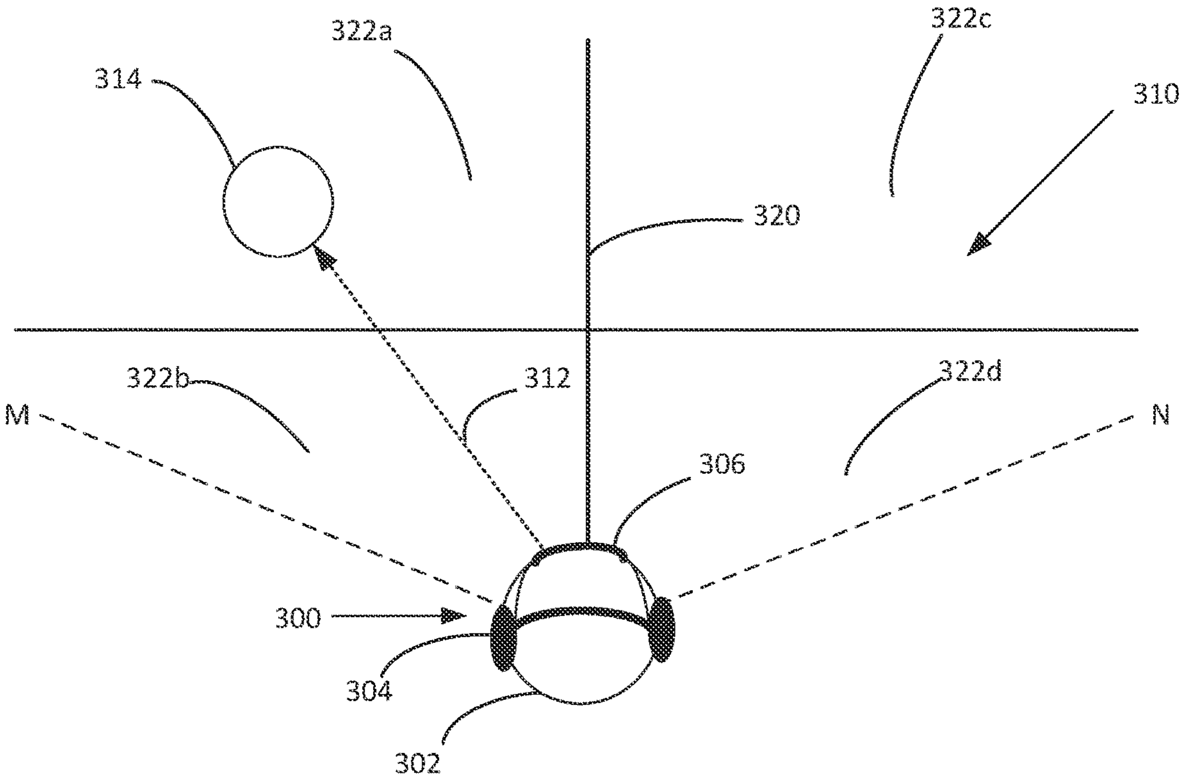
FIG. 3 is a conceptual diagram illustrating an example of the head gesture control system that includes eye movement control of a feature by identification of a section of a field of view, in accordance with some implementations.

In some implementations, the gesture control system may include additional wearable device(s) to provide information to control features associated with the hearable device. FIG. 3 shows an example of the head gesture control system in which eye tracking functionality may be implemented to detect user eye movement that indicates a section of the field of view of interest to the user and/or indicates a target sound source located in the field of view.

FIG. 3 shows an example of the gesture control system 300 that includes a hearable device 304 and a wearable device 306 in the form of glasses worn by a user 302. The wearable device 306 captures data of the user head and/or data from the environment of the user and communicates the data to the hearable device. In some implementations, the wearable device does not also function to display created visual content to the user. The wearable device and hearable device may also be integrated into a hearable device that include inward and/or outward facing image capture sensors.

The wearable device 306 detects eye position and movement of the user 302 and detects eye gaze 312 toward object 314 (e.g., a person, animal, thing, etc.). The gesture control system may detect a section 322*a* of the field of view 310, for example a first quadrant or upper left quadrant. Other quadrants illustrated include 322*b*, 322*c*, and 322*d*. The field of view 310 is the space viewable by the user 302 and illustrated by imaginary dotted lines M, N, using horizontal spatial separation and/or vertical spatial separation.

The wearable device 306 may include a variety of sensor devices that include an image capture sensor (e.g., camera) facing the eyes of the user 302. In some implementations, the wearable device 306 may further include an outward facing image capture sensor directed to the field of view. The outward facing image capture sensor captures images of objects in the field of view, as described below in FIG. 4. In some implementations, an outward facing image capture sensor may be a separate component rather than integrated with the wearable device, such as item 506 in FIG. 5. The wearable device 306 may be in the form of glasses (including goggles), a headset, and other devices that include the image capture sensor positioned to capture eye movement of the user. The wearable device 306 is in communication with the hearable device 304 to exchange information regarding user movement and/or objects in the field of view.

The feature associated with the hearable device may be adjusted to be directed toward the indicated section of the field of view. For example, an audio beam forming feature may be adjusted by directing focus of the hearable device toward the indicated section. In some implementations, the field of view may be divided into the sections, such as quadrants, halves, or other grid configurations to create sections of the field of view.

Feedback may be provided as a notification to the user of the section of a sound field or target sound source determined by the eye movement detection process described above in FIG. 3 and below in FIG. 4. The feedback notification may inform the user of the direction to which an audio beam is focusing or other feature is directed. For example, an audio speech may be outputted through the speakers of the hearable device and state the identified section of the field of view, as illustrated “upper left section focused”, or other speech outputs.

Figure 4:
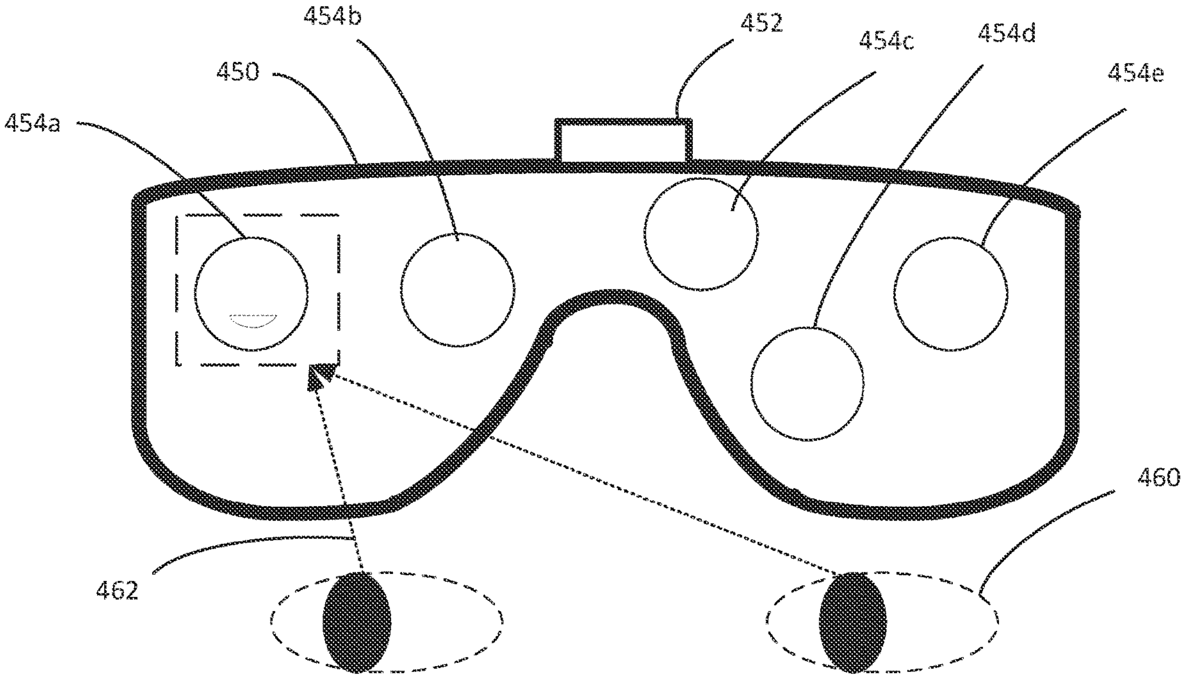
FIG. 4 is a conceptual diagram illustrating an example of the head gesture control system that includes eye movement control of a feature by identification of an object in the a field of view, in accordance with some implementations.

FIG. 4 shows an example of the head gesture control system in which eye tracking functionality may be implemented to detect user eye movement that indicates a target sound source located in the field of view. Various known eye tracking techniques may be employed. A wearable device 450 in the form of goggles may work in conjunction with the hearable device. The gesture control system may detect objects, such as faces located in proximity to the user. The wearable device includes one or more image capture sensors 452 including an inward facing sensor positioned to detect user movement, such as position of user eyes 460 and/or facial expression. The image capture sensors 452 detects eye movement and gaze in a particular direction 462 (illustrated by dotted arrow line). The image capture sensors 452 may include one or more outward facing sensors to detect objects in the field of view of the user. In the illustration in FIG. 4, several persons 454*a*, 454*b*, 454*c*, 454*d*, 454*e* are detected in the environment. The gesture control system matches the direction of the eye movement and gaze 462 with person 454*a* and determines that person 454*a* is the target sound source (illustrated by imaginary dashed rectangle around person 454*a*) indicated by the user movement.

Once the target sound source is determined, the feature may be adjusted positively or negatively for the sound from the target sound source. For example, audio beam forming may be positively adjusted to focus onto the target sound source and increase hearing of the sound. In some implementations, the feature may be negatively adjusted to decrease or block sound from the target sound source.

By relying on the eye sight of the user, the target sound source may be detected and/or the feature may be adjusted at various times relative to sound being produced by the sound source. For example, the target source may be identified, and the feature may be adjusted toward the target sound source prior to the target source making sound or before the sound is picked up by the hearable device and/or the user. For example, the user may be aware that the target sound source may be a person, such as a child, with a soft voice that is difficult to hear. The user may enter an environment of the target sound source (or vice versa where the target sound source enters the environment of the user) and the user may perform head control gestures to prepare the hearable device toward the target sound source in anticipation of the sound. This may ensure that the user does not miss any sounds due to a delay in making the adjustments to the feature. The identification and adjustment may be also made while the target sound source makes the sound. The head control gesture may include a combination of user movements in a pattern specific for the intended feature adjustment, such as a nod and eye movement to gaze at the object. Head control gestures may also be used in combinations or interchangeably with other device interactive controls, such as tapping on the hearable device or touching a button on the device.

In some implementations, the gesture control system may employ facial recognition or object recognition algorithms to identify a target person or object indicated by the user eye gaze. Such recognition processes may also be offloaded to be performed by an external device, such as a smart phone or server, in communication with the gesture control system, e.g., BLUETOOTH, WiFi, etc. In still some implementations, the hearable device may pick up on sounds from a sound source in a sound field but the sound source is not in the field of view of the user. The hearable device may communicate detection of such invisible sound source to the user and/or wearable device.

The feedback notification may include the identification of the object, such as a name of a person, type of object (e.g., dog), or other descriptive identifications obtained by image analysis of the object. An audio speech may be outputted, such as through the speakers of the hearable device, including the identification of the identified target person. Tactile feedback may also be provided.

In some implementations, the control system uses a threshold confidence value to ensure that the detected user movement satisfies gesture factors sufficiently to be identified as a head control gesture.

Figure 5:
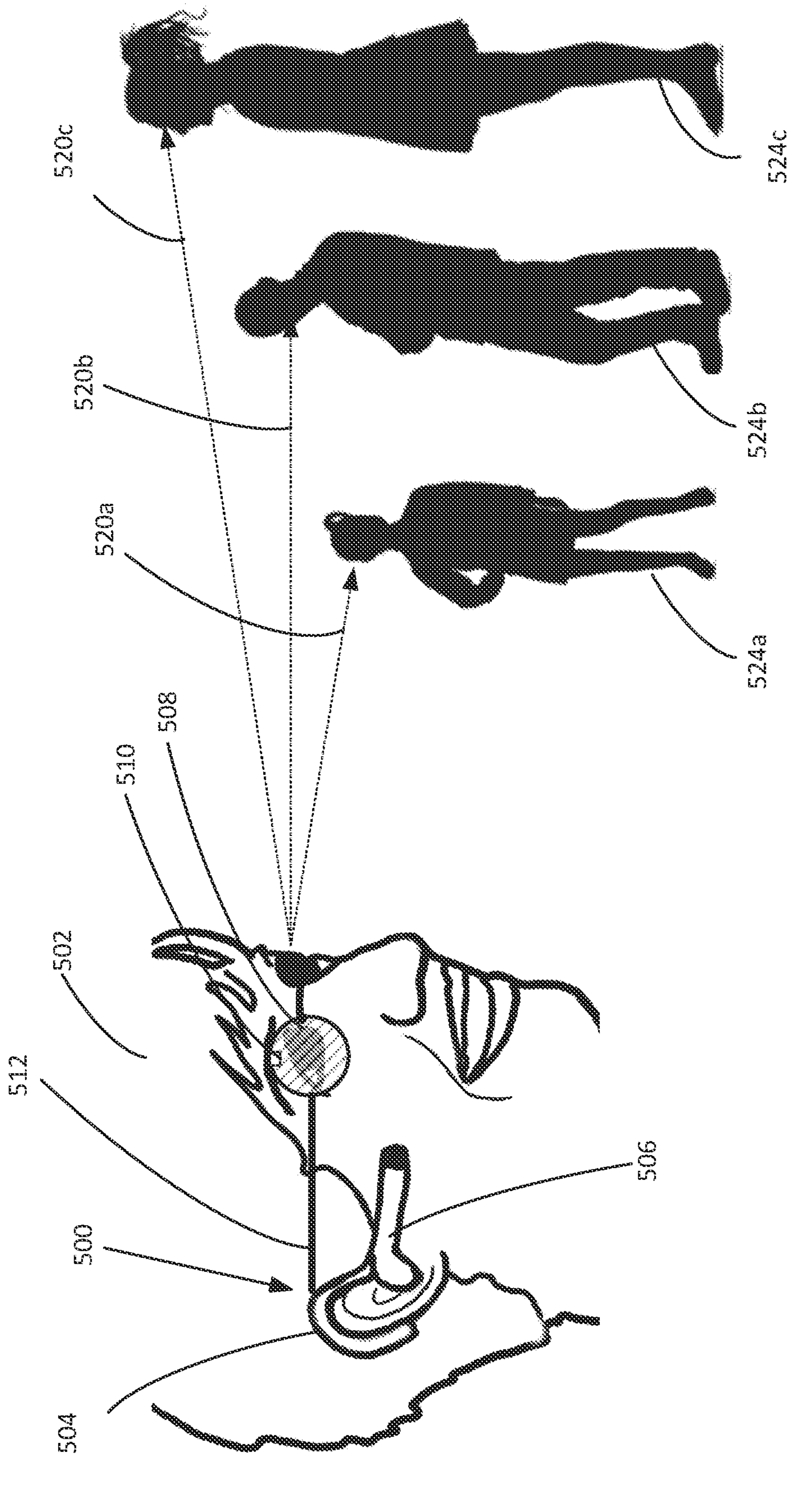
FIG. 5 is a conceptual diagram illustrating an example of the head gesture control system that includes eye gaze control of a feature using vertical spatial separation, in accordance with some implementations.

FIG. 5 shows the head gesture control system 500 using eye movement, e.g., eye gazing, of a user 502 to control a feature associated with the hearable device 504, such as audio beam forming, toward a sound source using vertical spatial separation. An outward facing image sensor device (e.g., camera) 506 may be coupled to the hearable device 504. An inward facing image capture sensor 510 or a wearable device (e.g., glasses) 508 may detect eye movement, eye position, facial expression, and/or facial movements. Wearable device 508 may be secured to the user 502 by a pair of stems 512 or strap extending on opposite sides of the head. Where a separate hearable device is provided with speakers positioned over or inside the ears, the straps or stems need not cover the ears.

The user may gaze downward toward small person 524*a*, straight across toward medium person 524*b* or upward toward tall person 524*c*. Each person 524*a*, 524*b*, and 524*c* may be positioned in a same horizontal place from the user. If the hearable device is limited to only horizontal spatial separation, the hearable device may identify just a single sound source. The outward facing image capture sensor may assist in detecting the separate sound sources, and coupled with the inward facing image capture sensor 510 that captures the user 502 eye movement/gaze 520*a*, 520*b*, and 520*c* in a vertical direction toward the respective persons 524*a*, 524*b*, and 524*c*

The hearable device 504 may include vertically spaced microphones (not shown) that can be used to distinguish sound sources in a vertical direction as well as horizontally spaced microphones that can be used to distinguish sound sources in a horizontal direction.

Figure 6:
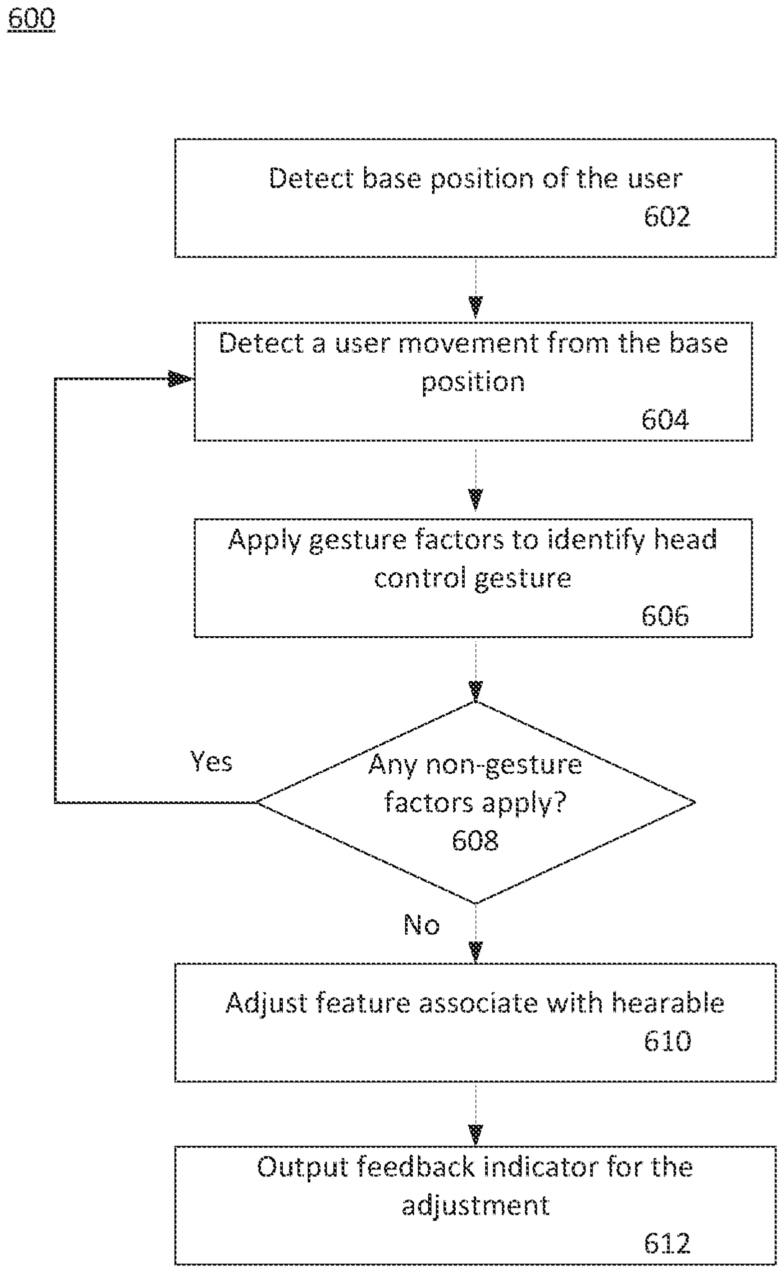
FIG. 6 a flow diagram of an example method for controlling a feature associate with a hearable using head control gestures, in accordance with some implementations.

FIG. 6 shows a flow chart of a head control gesture process 600 performed by the gesture control system. In block 602, a base position of the user is detected, as described above. The base position is referenced to detect a user movement from the base position in block 604.

In block 606 gesture factors are applied by comparing data describing the user movement to the stored gesture factors. When the gesture factors are satisfied, the head control gesture may be identified. In some implementations, the user movement associated with the user head may be combined with assessment of other user actions, such as non-speech sounds made by the user. Some examples of detecting non-speech sounds as control gestures are described in patent application entitled, "Non-Speech Sound Control With A Hearable Device," filed Mar. 29, 2024, the contents of which are incorporated by reference herein. However, such identification of head control gestures may be preliminary should the identification be rejected as a random user movement according to decision block 608.

In some implementations, the head gesture may be used as a non-verbal cue, along with additional detected non-verbal cues such as non-speech sound gestures, in determining a user state. The non-verbal cues may be used to passively adjust certain settings and/or modes of the hearable device based on a determined physical state of the user.

In decision block 608, it is determined whether any non-gesture factors are adequately satisfied by the user movement. Various context information may be gathered about the user movement to determine if non-gesture factors are satisfied, such as elements related to the environment of the user, user activity, other sounds by the user, other characteristics of the movement, etc. Non-gesture factors include considerations that can indicate the user movement is not a head control gesture, even if the user movement satisfies some or all of the gesture factors.

Non-gesture factors may include characteristics of the user movement, such as interfering sub movements of the user. For example, where a user is expected to move the head from a point A to point B for a gesture factor, if a movement to a point C occurs in between moving from A to B, the movement to point C may be considered a non-gesture factor and result in rejection of the head control gesture. Other characteristics may be a speed, smooth versus jerky movements such as during a sneeze, etc. Non-gesture factors may also include accompanying body function non-speech sounds of the user, such as a noise made by the user during a sneeze, cough, burp, etc.

In some implementations, the non-gesture factors may be specific to the user current activity or environment. For example, if the user is participating in an activity such as running that may result in inadvertent head movements, the control system may disregard the head control gesture during the activity or disable the head control gesture functionality all together during the activity. Similarly, if the user is in and environment that promotes inadvertent head movements, the user movements may be rejected as head control gestures.

If the non-gesture factors are satisfied, the preliminary identified head control gesture is rejected and the process returns back to block 604 to scan for and detect further user movements. If the non-gesture factors are not satisfied the head control gesture identification is confirmed and the process proceeds to block 610. In some implementations, a threshold confidence value is applied to determine whether sufficient non-gesture factors are satisfied to reject the user movement as a head control gesture.

In block 610, the feature associated with hearable device is adjusted as prescribed by the confirmed head control gesture. In some implementations, the feature may include audio beam forming and the adjustment may include refocusing hearing enhancement components, such as filtering and/or amplification, of the hearable device.

In block 612, a feedback indicator is outputted to the user describing the feature adjustment. The feedback indicator includes a description of the type of feature being adjusted, the amount of adjustment and/or type of adjustment. The feedback indicator may be an audio speech describing the adjustment, rather than a non-descript and non-verbal sound, such as a beep.

Feedback may also include tactile notification such as vibration of one or more earpads or other hearable device component in contact with the skin of the user. Such feedback indicator may be coupled with an audio notification of the adjustment or be used as the only type of feedback to the user.

The feedback indicator may be outputted at various times in the process, such as after the feature adjustment is identified as being correlated with a detected and identified head control gesture. In this manner, the user may choose to override the adjustment before the feature adjustment is made. In some implementations, the feedback indicator may be outputted during the process of adjusting the feature. In still other implementations, the feedback indicator may be outputted immediately after the feature adjustment is completed. In this case, the user may opt to reverse the feature adjustment or make additional changes to the adjustment that has completed by making further head control gestures.

In some implementations, the feedback indicator is an audio identification of a recognized source selected from stored candidate sound sources. At least one of the microphones of the hearable device may receive sound signals for a sound made from a target sound source in the environment of the user. The gesture control system may compare the sound with stored sound prints. The stored sound prints are data previously stored sound snippets produced by candidate sound sources. For example, voiceprints of person(s) known as important to the user may be stored in a database accessible to the gesture control system. Other common sounds by objects are possible, such as the sound of a vehicle, animal, machine, etc. Some stored sounds may be context related, such as sounds associated with a particular environmental or user activity related, for example, a loudspeaker announcement. The sound signals may be matched to the sound print and the target sound source may be identified as a recognized source from the collection of candidate sound sources. The feedback indicator may announce the name of person or object that is the recognized sound source.

The user may provide a follow-up head control gesture in response to receiving the feedback indicator. Such follow-up gesture may be used to cancel the feature adjustment, such as if the adjustment was in error, to make further adjustments to the feature, such as increase or decrease a strength of the adjustment or make additional adjustments to the feature or other features.

In some implementations, the feedback indicator may be in the form of an inquiry outputted to the user to elicit a response from the user. For example, the feedback indicator may state a description of an impending feature adjustment and request the user to confirm that the feature adjustment is intended by the user. The control system may pause in making the adjustment as it scans for user movement as an additional head control gesture response, e.g., a nod up and down or shake left and right, that conveys that the user intends the feature adjustment. Once the response is received, the control system may continue with the feature adjustment or abandon the adjustment according to the response.

Other variations of the process described for FIG. 6 are possible. For example, in some implementations block 606 identifying a head control gesture and block 608 rejecting the gesture as random movement, may occur in a reverse order. A user movement may be determined to satisfy a non-gesture factor in block 608 and be disqualified before consideration as a head control gesture in block 606.

Figure 7:
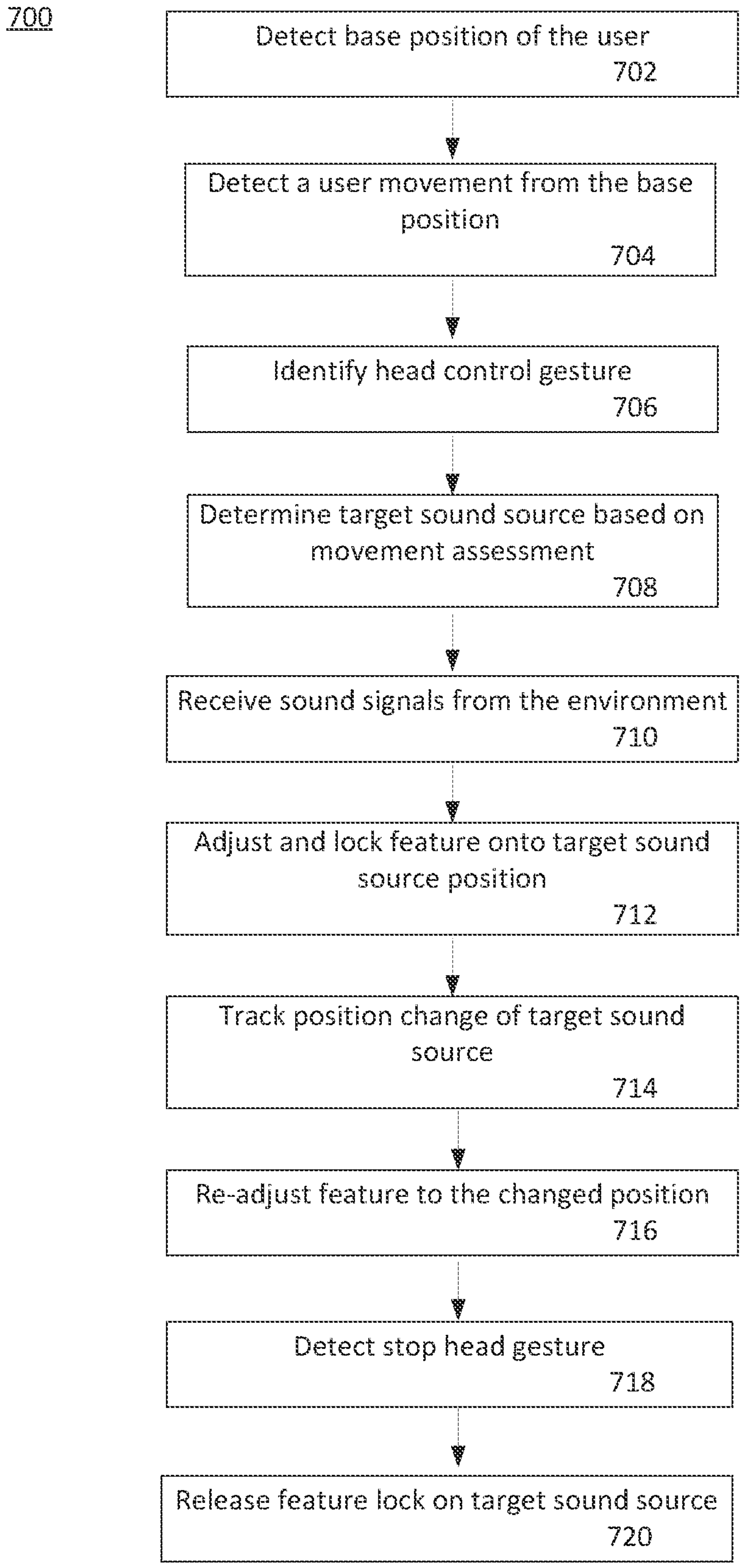
FIG. 7 is a flow diagram of various example method for controlling a feature associated with a hearable by locking onto a sound source, in accordance with some implementations.

FIG. 7 shows a flow chart of a head control gesture process 700 using target locking, performed by some implementations of the gesture control system. In block 702, a base position of the user may be detected, as described above in item 602 of FIG. 6. In block 704, a user movement from the base position may be detected, as described above in item 604 of FIG. 6. In block 706, a head control gesture may be identified, as described in items 606 above in FIG. 6.

In block 708, target sound source including a direction of the target sound source relative to the user, may be determined based, at least in part, an assessment of the user movement that indicates a user intended target sound source. For example, the user may gaze eyes in the direction for a predefined period of time, gaze in a pattern of looking, or combine the eye gaze with other predefined user movements. Other user movements that indicate a target sound source are possible.

In block 710, the hearable device receives sound signals from the environment. The sound signals may be from the target sound source identified in block 708. In block 712, the feature that correlates with the head control gesture, is adjusted according to the identified head control gesture. In some implementations, the control system may lock onto the target sound source and maintain focus onto the current position of the target sound source in the environment. For example, one or more audio elements, such as beam forming components including components for sound filtering and/or amplification, may be focused onto the recognized target source according to a direction of the recognized target source provided by an outward facing image capture device and/or eye gaze detection in the direction of the target sound source.

In block 714, as the target sound source may move about the environment still in proximity of the user (e.g., within a detection zone), the changed position of the target sound source may be tracked, e.g., through either the user turning the head or the sound source moving relative to the user, moving around the user. For example, the outward facing image capture device may capture images of the target sound source and a new position may be determined. In some implementations, the target sounds source may be tracked during a sequence of head control gesture movements. The head control movements may change in the direction of the moving target sound source. In some implementations, the head control gestures may indicate a starting location of the target sounds source and further head control gestured may indicate an ending location of the target sound source (e.g., while the sound source is stationary). The locked feature(s) may be readjusted to focus onto the new position of the target sound source in block 716. In some implementations, the feature may continue to be adjusted in the direction of the target sound source as the sound source moves about the environment of the user.

In some implementations, a user can direct the locking direction, such as a sound target directly ahead, by various combinations of gestures, such as double tapping on the hearable or doing a couple of rapid head gesture nods, and that sound target can be locked. When the user turns his or her head, the hearable will still be focused on the identified sound target which would now be off-center. Another aspect of source locking may include a locked target sound source that moves while the user stays still.

The lock of the feature(s) onto the target sound source may be released by various mechanisms. For example, in block 718, the control system may detect a stop head gesture by the user in a similar manner as the detection and identification of the head control gesture described. Various stop gesture factors may be applied to indicate a user intent to stop focus on the target sound source. In block 720, responsive to the stop head gesture, the feature(s) may be readjusted to stop locking onto the target sound source.

In some implementations, release of the feature lock may also be triggered by the target sound source exiting a detection zone in proximity to the user, the target sound source not making sounds for a predefined period of time, and other unlock triggers are possible.

The methods of FIGS. 6 and 7 described herein can be performed via software, hardware, and combinations thereof. The process may be carried out in software, such as one or more steps of the process carried out by the head gesture control system. For example of some alternative combinations in FIG. 6, a sound may be initially received by the hearable device and/or heard by the user in block 610 and then a target sound source may be determined in block 608 in which a direction of the received sound may be considered in determining the target sound source. In other alternative combinations, a step of locking of a feature, e.g., audio elements, in block 712 of FIG. 7 may take place prior to a step of receiving the sound signals in block 710. Although the description has been described with respect to particular implementations thereof, these particular implementations are merely illustrative, and not restrictive.

Figure 8:
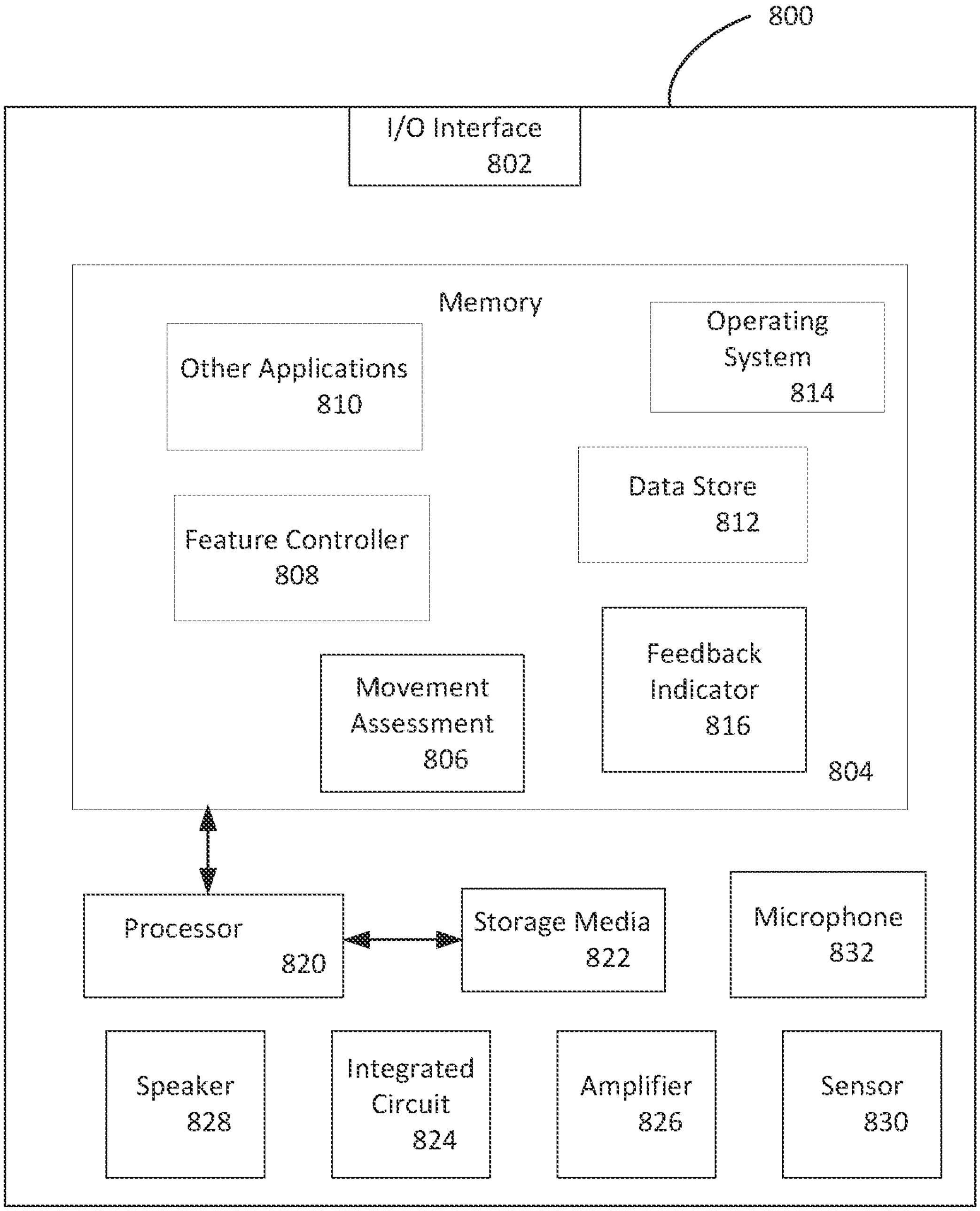
FIG. 8 is a block diagram of components of the head gesture control system usable to implement in the processes of FIGS. 6 and 7, in accordance with some implementations.

FIG. 8 is a block diagram illustrating some example functional electronic components of a hearable device of the gesture control system (also referred to as an apparatus) upon which aspects of the gesture control processes described herein may be implemented. The hearable device 800 is merely illustrative and not intended to limit the scope of the claims. One of ordinary skill in the art would recognize other variations, modifications, and alternatives. The components shown are illustrative of only some of the components of the hearable device, as other components typically present.

In one exemplary implementation, hearable device 800 includes an I/O interface 802 (which may represent a combination of a variety of communication interfaces). In some implementations, interface 802 may communicate with wearable device (such as glasses 550 in FIG. 5) and/or image capture sensor(s) (such as item 506 and 510 in FIG. 5) to receive image information and/or user eye movement data. The connection with the wearable devices may be wired, such as electrical cables, or wireless as described below. For example, wires may extend through stems (such as item 512 in FIG. 5) of glasses to physically connect with the hearable device at the ears of the user. The interface 802 may also be enabled for wireless communication, such as via BLUETOOTH, BLUETOOTH Low Energy (BLE), radio frequency identification (RFID), etc. Wireless communication may be enabled to communicate with another earbud of a pair or hearing aid of a pair while being worn at the other ear of the user.

In some implementations, hearable device 800 may also include software that enables communications of I/O interface 802 over a network such as HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like. The communication network may include a local area network, a wide area network, a wireless network, an Intranet, the Internet, a private network, a public network, a switched network, or any other suitable communication network, such as for example Cloud networks.

The microphone(s) 832 include hardware for detecting sounds. The microphone(s) 832 may be positioned to detect environmental sounds as well as sounds of the user. The microphone 832 may provide information about some of the sounds, e.g., sounds that indicate non-gesture movements, to the movement assessment module 806 and convert some of the detected sounds to an electrical signal that is transmitted to the speaker 828, which in some implementations may be via the I/O interface 802. Other common hearable device components may be include an integrated circuit 824 for controlling functions. For example, a receiver may be included for microphone(s) to receive sound input and various other known components.

A speaker 828 may be included to output sound, such as content being played, audio feedback (e.g., speech) to the user from stored feedback snippets produced by feedback indicator module 816, etc. Speaker 628 can include hardware for receiving the electrical signal from the microphone 632 and convert the electrical signal into sound waves that are output for the user to hear. For example, the speaker 628 may include a digital to analog converter that converts the electrical signal to sound waves.

A computer chip-embedded amplifier 826 is provided to convert electrical signals from the microphones to digital signals. In some implementations, the speaker 628 includes the amplifier 626 to amplify, reduce, or block certain sounds based on a particular setting or mode. For example, the amplifier may block ambient noise when a noise cancelling setting is activated.

Sensor(s) 830 may be provided to detect user movements. Examples of sensor(s) 830 may include one or more accelerometer (e.g., one-dimensional movement data relative to gravity), gyroscope (e.g., for rotational movement in combination with accelerometer data), magnetometer (e.g., movements relative to north pole), proximity detection (e.g., radar, lidar, infrared, etc.), and other sensors to detect or determine movement. Often a combination of sensors provide data used by movement assessment module 806 to determine head control gestures.

Hearable device 800 typically includes additional familiar computer components such as a processor 820, and memory storage devices, such as a memory 804. A bus (not shown) may interconnect hearable device components. While a computer is shown, it will be readily apparent to one of ordinary skill in the art that many other hardware and software configurations are suitable for use with the present invention The hearable device 800 may include a solid state memory in the form of NAND flash memory and storage media 822. The computer device may include a microSD card for storage and/or may also interface with cloud storage server(s). Memory 804 and storage media 822 are examples of tangible non-transitory computer readable media for storage of data, audio files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 812 may be employed to store various on-board data such as a database of stored sound prints of candidate sound sources, database of gesture factors that correspond to particular feature adjustments, database of non-gesture factors that correspond with random movements that are not head control gestures, etc.

Hearable device 800 may include one or more computer programs, such as one or more software modules for movement assessment 806, feature controller 808, feedback indicator module 816 and various other applications 810 to perform operations described herein. The movement assessment module 806 performs one or more operations of assessing user movement to determine head control gestures by applying gesture factors and/or non-gesture factors, such as described with regard to blocks 506 and 508 in FIG. 5. The feature controller 808 may control operations of adjusting features according to the determined head control gesture, such as described with regards to block 510 in FIG. 5. For example, adjustments may include changes in functionality of microphone(s) and processing of sound received by the microphone according to the direction of the target sound source. Beam forming feature controls may include adjusting filtering and/or amplification, such as via amplifier 826 of particular sounds to isolate the sound. Other methods of adjusting the focus of the hearable device, such as redirecting the direction of the microphones are possible.

Such computer programs, when executed by one or more processors, are operable to perform various tasks of using head control gesture to adjust features associated with the hearable device, as in the methods described above. The computer programs may also be referred to as programs, software, software applications or code, may also contain instructions that, when executed, perform one or more methods, such as those described herein. The computer program may be tangibly embodied in an information carrier such as computer or machine readable medium, for example, the memory 804, storage device or memory on processor 820. A machine readable medium is any computer program product, apparatus or device used to provide machine instructions or data to a programmable processor.

Hearable device 800 further includes an operating system 814 to control and manage the hardware and software of the hearable device 800. Any operating system 614, e.g., mobile OS, that is supports the noise cancelation override methods may be employed, e.g., IOS, Android, Windows, MacOS, Chrome, Linux, etc.

Although the description has been described with respect to particular implementations thereof, these particular implementations are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for using a head gesture to control of a feature associated with a hearable device, the method comprising:

detecting a plurality of user first movements of a user of the hearable device and a plurality of user second movements of the user;

gathering context information associated with the plurality of user second movements;

identifying the plurality of user first movements as a head control gesture corresponding to a particular adjustment of the feature associated with the hearable device, by applying one or more gesture factors and identifying the plurality of user second movements as non-gesture movements by applying one or more non-gesture factors;

based, at least in part, on identifying the head control gesture, adjusting the feature according to the particular adjustment and rejecting the non-gesture movements for control of the feature; and outputting to the user, a feedback indicator to describe the adjusting of the feature.

2. The method of claim 1, wherein the feature is selected from the group of: setting, mode, audio content player, audio beam focus, audio source tracking, calling interaction, smart assistant operation, and combinations thereof.

3. The method of claim 1, further comprising:

assessing the plurality of user first movements to determine a target sound source in an environment of the user;

receiving by one or more microphones of the hearable device, sound signals for a sound from the target sound source;

based, at least in part, on determining the target sound source, locking onto the target sound source by adjusting one or more audio elements of the hearable device to enhance hearing of the sound;

tracking a change in direction of the target sound source; and based on the change in direction, readjusting the feature to maintain enhanced hearing of the sound.

4. The method of claim 1, wherein the feature includes one or more audio elements, the method further comprising:

assessing the plurality of user first movements to determine a direction of a target sound source in an environment of the user;

receiving by one or more microphones of the hearable device, sound signals for a sound from the target sound source;

based, at least in part, on determining the target sound source, locking onto the target sound source by adjusting the one or more audio elements of the hearable device to enhance hearing of the sound;

tracking a change in direction of the target sound source as the target sound source moves location relative to the user; and based on the change in direction, readjusting the feature to maintain enhanced hearing of the sound.

5. The method of claim 1, wherein the feature includes audio beam focusing and wherein the feedback indicator includes a notification of a section of a sound field that the audio beam focusing is directed.

6. The method of claim 1, wherein identifying the head control gesture comprises:

detecting a base head position prior to the plurality of user first movements; and assessing the plurality of user first movements relative to the base head position.

7. The method of claim 1, further comprising:

outputting an inquiry for user control;

detecting the plurality of user first movements; and determining the plurality of user first movements is responsive to the inquiry.

8. A head gesture control system to adjust at least one audio element feature associated with a hearable device, the head gesture control system comprising:

at least one sensor to detect plurality of user movements of a user using the hearable device;

a hearable device of a user comprising:

one or more processors; and logic encoded in one or more non-transitory media for execution by the one or more processors and when executed, operable to perform operations comprising:

detecting a plurality of user first movements of a user of the hearable device;

assessing the plurality of user first movements to determine a direction of a target sound source in an environment of the user;

identifying the plurality of user first movements as a head control gesture corresponding to a particular adjustment of the at least one audio element feature associated with the hearable device, by applying one or more gesture factors;

receiving by one or more microphones of the hearable device, sound signals for a sound from the target sound source;

based, at least in part, on identifying the head control gesture and the determined direction of the target sound source, adjusting the at least one audio element feature of the hearable device to enhance hearing of the sound according to the particular adjustment; and outputting to the user, a feedback indicator to describe the adjusting of the at least one audio element feature;

tracking a change in direction of the target sound source as the target sound source moves about the environment to a different location relative to the user; and based on the change in direction, readjusting the at least one audio element feature to maintain enhanced hearing of the sound.

9. The head gesture control system of claim 8, wherein the at least one audio element feature is selected from the group of: setting, mode, audio content player, audio beam focus, audio course tracking, calling interaction, and smart assistant operation, and combinations thereof.

10. The head gesture control system of claim 8, wherein the operations further comprise:

assessing the plurality of user first movements to determine a target sound source in an environment of the user;

receiving by one or more microphones of the hearable device, sound signals for a sound from the target sound source;

based, at least in part, on determining the target sound source, locking onto the target sound source by adjusting the one or more audio elements of the hearable device to enhance hearing of the sound;

tracking a change in direction of the target sound source; and based on the change in direction, readjusting the one or more audio elements to maintain enhanced hearing of the sound.

11. The head gesture control system of claim 8, wherein the operations further comprise:

detecting at least one of a tactile input, voice input, and visual input; and identifying the at least one of the tactile input, voice input, and visual input as a control input for the at least one audio element feature, wherein adjusting of the at least one audio element feature of the hearable device is further based on identifying the control input.

12. The head gesture control system of claim 8, further comprising a wearable configured to be worn by the user and to hold the sensor positioned to detect the plurality of user first movements.

13. The head gesture control system of claim 12, wherein the plurality of user first movements includes eye movement and wherein the wearable includes at least one reverse camera configured to detect the eye movement.

14. The head gesture control system of claim 8, wherein the operations further comprise:

receiving a plurality of user second movements of the user;

gathering context information associated with the plurality of user second movements;

applying one or more non-gesture factors to identify the plurality of second user movements as non-gesture movements; and rejecting the non-gesture movements for control of the at least one audio element feature.

15. A non-transitory computer-readable storage medium carrying program instructions thereon for using head gesture to control a feature associated with a hearable device, the instructions when executed by one or more processors cause the one or more processors to perform operations comprising:

detecting a plurality of user first movements of a user of the hearable device and a plurality of user second movements of the user;

gathering context information associated with the plurality of user second movements;

identifying the plurality of user first movement as a head control gesture corresponding to a particular adjustment of the feature associated with the hearable device, by applying one or more gesture factors and identifying the plurality of user second movements as non-gesture movements by applying one or more non-gesture factors;

based, at least in part, on identifying the head control gesture, adjusting the feature of the hearable device according to the particular adjustment and rejecting the non-gesture movements for control of the feature; and outputting to the user, a feedback indicator to describe the adjusting of the feature.

16. The non-transitory computer-readable storage medium of claim 15, wherein the feature is selected from the group of: setting, mode, audio content player, audio beam focus, audio source tracking, calling interaction, and smart assistant operation, and combinations thereof.

17. The non-transitory computer-readable storage medium of claim 15, wherein the operations further comprise:

assessing the plurality of user first movements to determine a target sound source in an environment of the user;

receiving by one or more microphones of the hearable device, sound signals for a sound from the target sound source;

based, at least in part, on determining the target sound source, locking onto the target sound source by adjusting one or more audio elements of the hearable device to enhance hearing of the sound;

tracking a change in direction of the target sound source; and based on the change in direction, readjusting the one or more audio elements to maintain enhanced hearing of the sound.

18. The non-transitory computer-readable storage medium of claim 15, wherein the feature includes one or more audio elements, and wherein the operations further comprise:

assessing the plurality of user first movements to determine a direction of a target sound source in an environment of the user;

receiving, by one or more microphones of the hearable device, sound signals for a sound from the target sound source;

based, at least in part, on determining the target sound source, locking onto the target sound source by adjusting the one or more audio elements of the hearable device to enhance hearing of the sound;

tracking a change in direction of the target sound source as the target sounds source moves location relative to the user; and based on the change in direction, readjusting the feature to maintain enhanced hearing of the sound.

* * * * *